April 30, 1940.   C. A. CAMPBELL   2,198,760
AIR BRAKE
Filed Jan. 12, 1939   6 Sheets-Sheet 1

Inventor
Charles A. Campbell
By Dodge and Sons
Attorneys

April 30, 1940.     C. A. CAMPBELL     2,198,760
AIR BRAKE
Filed Jan. 12, 1939     6 Sheets-Sheet 3

Fig. 3

Inventor
Charles A. Campbell
By
Dodge
Attorneys

April 30, 1940.  C. A. CAMPBELL  2,198,760
AIR BRAKE
Filed Jan. 12, 1939  6 Sheets-Sheet 4

Inventor
Charles A. Campbell
By
Dodge and Sons
Attorneys

Patented Apr. 30, 1940

2,198,760

UNITED STATES PATENT OFFICE 2,198,760

AIR BRAKE

Charles A. Campbell, Watertown, N. Y., assignor to The New York Air Brake Company, a corporation of New Jersey Application January 12, 1939, Serial No. 250,665

21 Claims. (Cl. 303—21)

This invention relates to air brakes and particularly to high speed brakes of the deceleration controlled type. The simple form of such brakes is known as schedule DCE. The more refined forms now in commercial use are schedules HSC and AHSC. Schedule AHSC differs from HSC chiefly in the use of a convertible engineer's brake valve which may be set to operate the brake strictly as an automatic system, or may be set to operate the brakes on the straight air principle with deceleration control. The automatic side of the system then serves as a stand-by to produce automatic application as a result of a break-in-two, a conductor's emergency application, a deadman application or any application produced by the operation of some train control mechanism, if the latter be used.

Generally stated, systems of this sort have a normally charged train pipe which extends throughout the train, and a normally uncharged straight air pipe which also extends throughout the train. Both are connected to control valves on the various vehicles. These control valves comprise an automatic mechanism responsive to brake pipe pressure and a relay mechanism primarily responsive to straight air pipe pressure. There is, however, a selector mechanism which, in response to an application produced automatically, disconnects the relay temporarily from the straight air pipe and places it under control of the control valve. This connection continues until braking pressure is developed in the straight air pipe. Pressure is so developed by an application valve at the head of the train, the application valve responding to an emergency reduction of pressure in the brake pipe, which may be initiated in various ways.

A straight air application is controlled by a master relay having an electric portion and a pneumatic portion, control being in accordance with the pressure developed in a control chamber. The development of this pressure is initiated normally by the engineer's valve. In emergency applications, started in the automatic side of the system, it is initiated by the application valve. In either case, when the resulting brake application becomes sufficient to cause response of the deceleration controller, the latter intercepts the connection between the engineer's brake valve or the application valve, as the case may be, and the control reservoir. It then acts to modulate that pressure, such modulation normally involving reduction of control chamber pressure to cause a progressive release of the brakes to compensate for the rising co-efficient of brake shoe friction.

The deceleration controller comprises a modulating valve, preferably of the balanced piston type, which is shifted by an inertia mass against spring resistance. The inertia mass responds directly to the deceleration of the train.

Deceleration controlled brakes are used to secure high and uniform deceleration rates in applications made at relatively high speeds. At such speeds it is possible to use unusually high braking ratios, and necessary to use them, if reasonable stopping distances are to be had. However, the response of the deceleration controller as heretofore constructed is a function of deceleration rate, without regard to speed. If therefore a deceleration-controlled application of great intensity is attempted at low speed, the violent response of the deceleration controller will cause it to overcast, then reverse its action, and so on alternately with serious harmful results.

The engine driver will not deliberately attempt a heavy straight air application at low train speed, but under the stress of an emergency he might do so. One purpose of the present invention is to prevent his doing so and at the same time permit his making the maximum useful application practicable at the train speed existing when he starts the application.

More important however, is to control any automatic emergency application which may be caused at low train speeds by the operation of the conductor's valve, or the deadman mechanism, or in fact by any train control mechanism which, operating primarily on the automatic side of the system, will produce a straight air emergency response.

The invention contemplates a plurality of speed control relays which are effective at different speeds, one of which might be 40 miles an hour and another of which might be 80 miles an hour, to limit the rate of development of control chamber pressure and the maximum intensity of control chamber pressure which may be developed in an application commenced at the stated speed. These values are arbitrarily chosen, but will be used for purposes of explanation throughout the present specification.

The general principle of operation of the supervisory speed responsive control is that when train speed is below 40 miles an hour, control chamber pressure is limited to a moderate value and the rate of development of such pressure is quite sharply limited. Between 40 and 80 miles per hour, a higher limit is imposed and the rate of build-up is faster. Above 80 miles an hour no limit is placed on control chamber pressure or on the rate of development thereof beyond those limits which are inherent in the brake system.

While the embodiment here illustrated imposes two limits, one or any number may be used as desired. It is believed that in actual service three stages corresponding to 40, 60, and 80 miles per hour will be found best. A two-stage arrangement is here chosen for illustration because it is the simplest embodiment involving a plurality of stages. Once the principle of plurality stages is understood, the use of any number of stages is simply a matter of design.

It should be observed that the scheme above outlined is strictly a deceleration control and not control in response to the combined effect of speed and deceleration. The deceleration controller responds strictly to deceleration but the speed responsive relays limit the intensity of the initial application, and the rate at which that intensity can be developed, in such a way that at low speeds the action of the deceleration controller will occur between limits that insure smooth response without danger of over-casting.

By holding an intensity of application and its rate of development within limits appropriate to train speed at the time the deceleration controller is brought into action, the latter becomes effective to modulate a control chamber pressure which initially is reasonably harmonious with its own initial response. Consequently smooth stops can be had at all train speeds and the loss of braking effect, such as would be caused by wheel sliding, is avoided.

The invention will now be described in accordance with the accompanying drawings which show the installation on the propelling unit according to schedule AHSC. A system of this general AHSC type is shown in Patent 2,136,582, dated November 15, 1938. The novel mechanical aspects of the deceleration controller proper and its relation to the control chamber are not claimed in the present application as they form the subject matter of and are claimed in my copending application Serial No. 250,664, filed January 12, 1939.

In the drawings:

NOTE.—Figs. 1, 2, 3 and 4, when assembled from left to right in the order stated, and Figs. 5 and 6 when assembled beneath Figs. 3 and 4, respectively, produce a complete diagram of the system as used on the propelling unit. The equipments used on cars are essentially similar to the components shown in Figs. 5 and 6, except that they are supplied with air from local reservoirs charged from the brake pipe through the control valve on the car in question instead of being supplied with air by the main reservoir as is the case with reference to Figs. 5 and 6. It is deemed unnecessary to illustrate these car equipments since they are well known in the art and are not involved in the present invention.

The source of compressed air for the entire system is the main reservoir 11 (Fig. 6), which is supplied with compressed air through the connection 12 by any suitable compressor (not shown). The main reservoir supplies air to the main reservoir pipe 13 which has branches leading to the bracket 14 of the magnet valves, to the bracket 15 of the master relay (Fig. 4), to the air supply connection of the local relay 16, to the supply connection of the control valve 17, and to the supply connection in the pipe bracket 18 of the engineer's brake valve. It also supplies air to the feed valve 19, which delivers air to the supply connection of the bracket 21, on which are mounted the application valve and the vent valve.

There is a brake pipe 22 which extends from end to end of the train, and is connected from car to car by the usual flexible hose one of which appears at 23. Cut-out cocks 24 are used adjacent this hose connection as indicated. This pipe has the usual connection 25 to the base 18 of the engineer's brake valve, and in this connection is interposed the double-heading cock 26, which is normally open. The feed valve 19, charges the brake pipe 22, through the application valve and engineer's brake valve and therefore has a controlling pressure connection 27 with the branch 25 of the brake pipe 22 above the doubleheading cock 26. Brake pipe 22 has branches connecting with the pipe bracket 21 which supports the application and vent valves and with the brake pipe connection of the control valve 17.

The straight air pipe, all parts of which are indicated in the drawings by the numeral 28, extends from the propelling unit throughout the train, being connected from car to car by flexible hose, one of which is indicated at 29. Cut-out cocks 31, one of which appears in Fig. 4, are used at the ends of the cars.

Extending throughout the train are three electric conductors forming two selectively energized circuits, one of which produces application and the other of which produces release. The application wire is indicated at 32, the release wire at 33, while 34 is a common return wire. The source of current is a storage battery 35, which is kept charged by any suitable means. The return wire, the application wire and the release wires are connected from car to car by separable, flexible connections as indicated in Fig. 4.

Figure 4:
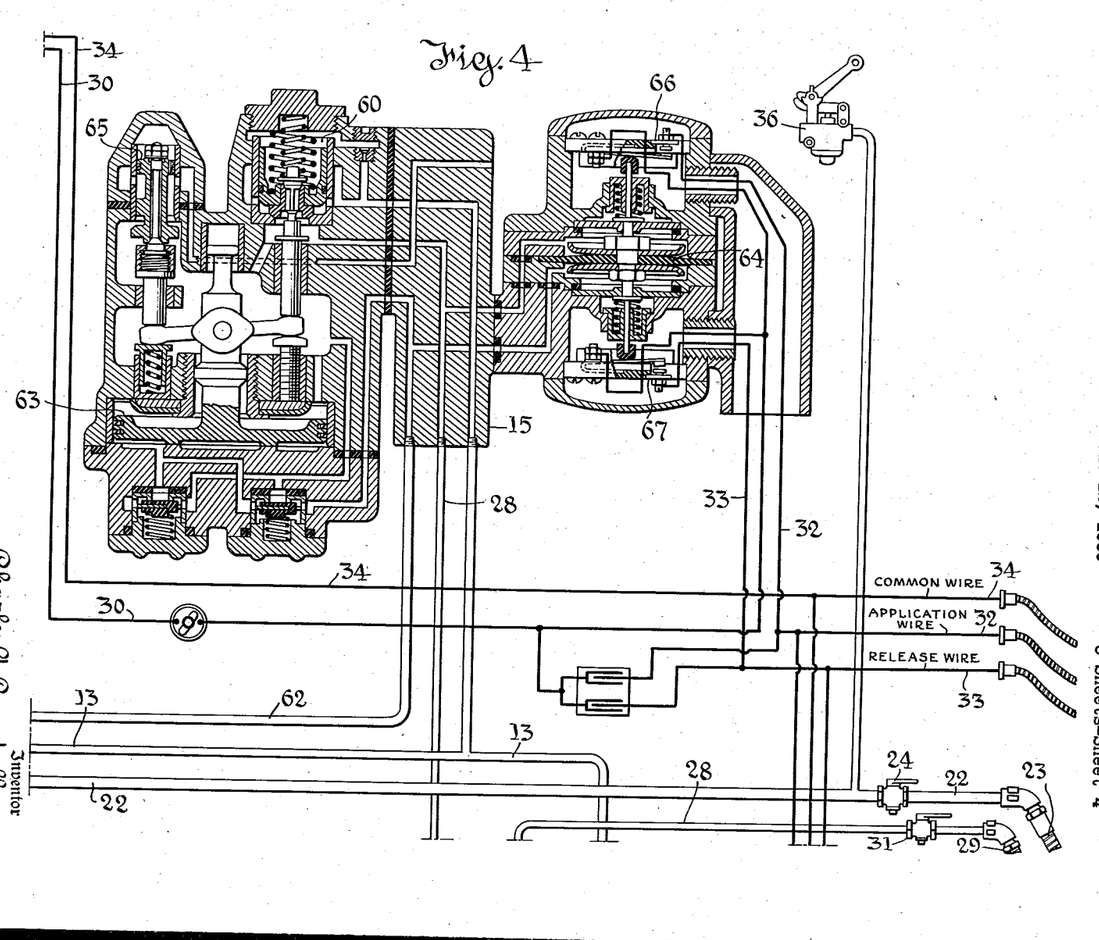
Fig. 4 is a diagrammatic view in section of the master pneumatic relay and the master relay switch with related connections.

On each car in the train and on the propelling unit are located conductor's valves such as the one indicated at 36 in Fig. 4. The function of these valves is to vent the brake pipe 22 and initiate an emergency application of the brakes. There is a conductor's valve 37 in the cab of the propelling unit, but this operates directly on the vent valve shown in Fig. 1, and through the vent valve upon the application valve also shown in Fig. 1. The effect of opening this vent valve is also to cause an emergency application.

Figure 1:
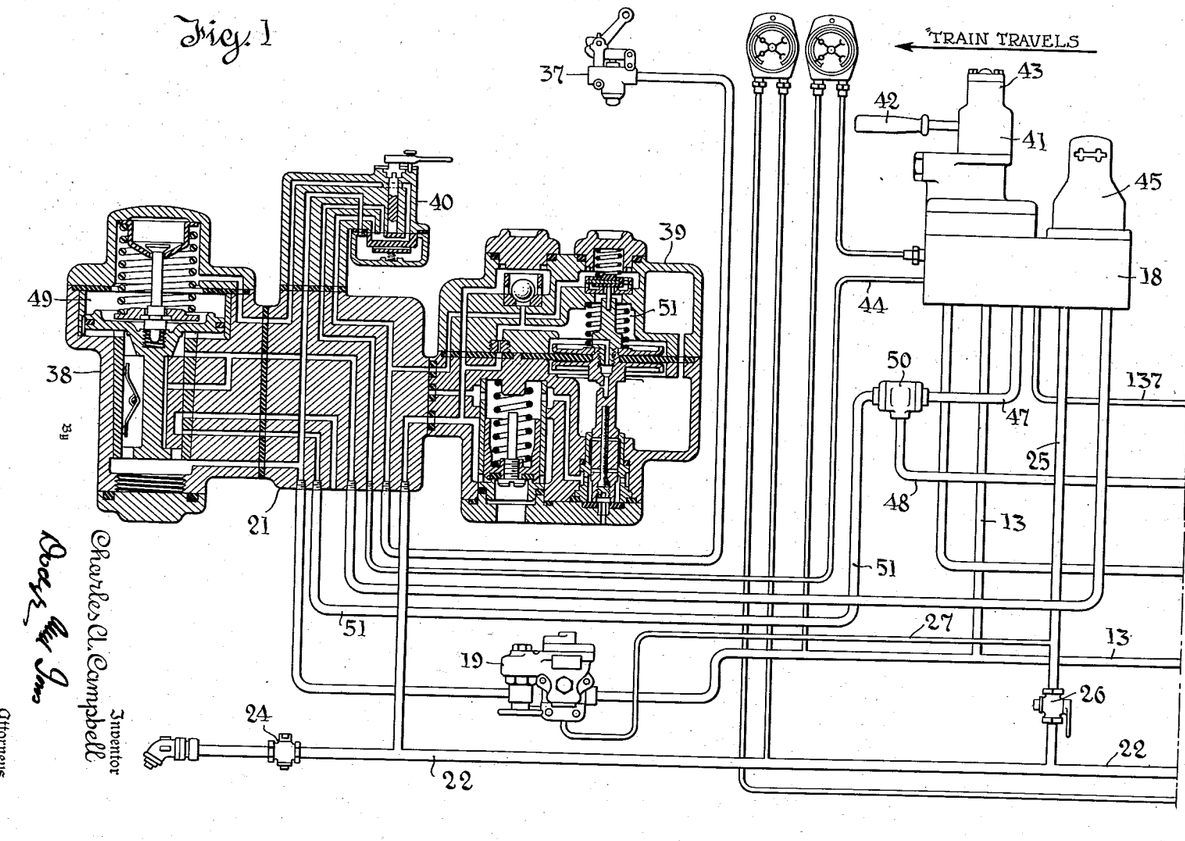
Fig. 1 is a diagrammatic view partly in section and partly in elevation showing the engineer's brake valve and the application and vent valves with associated connections.
Figure 2:
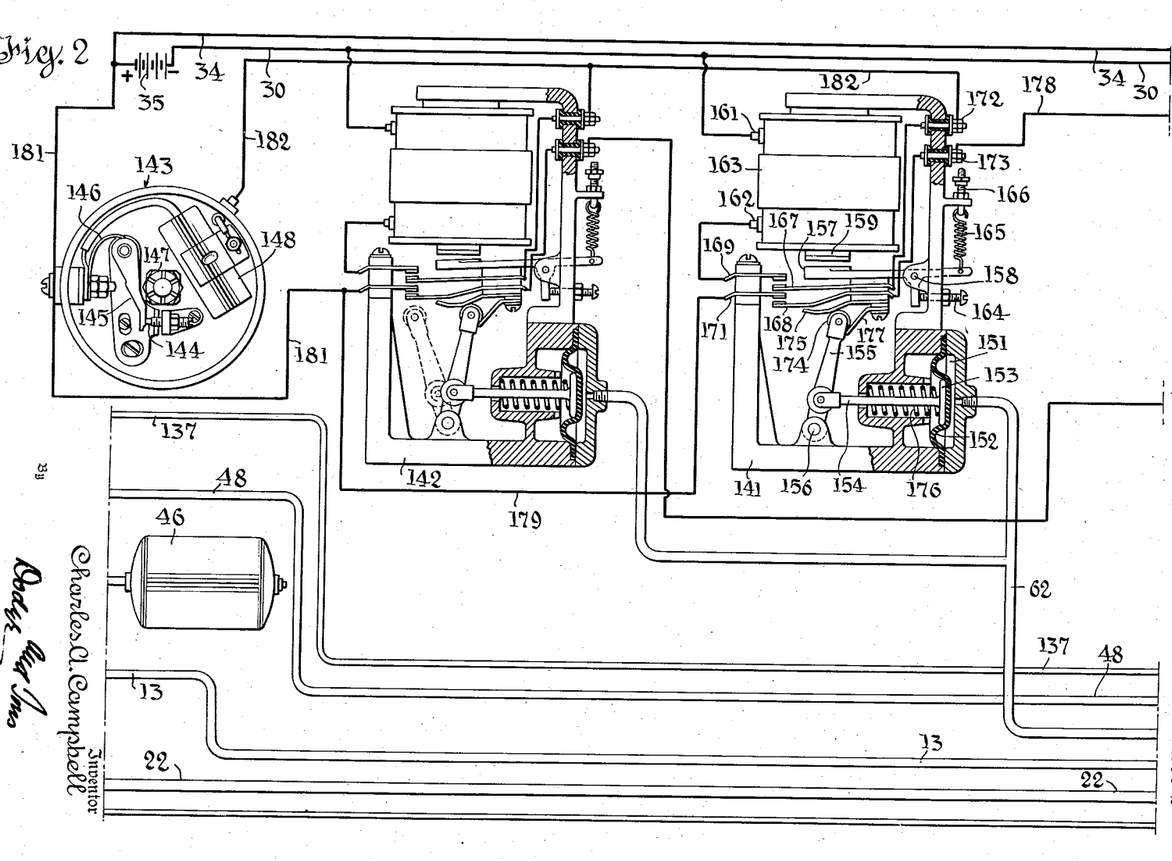
Fig. 2 is a diagrammatic view partly in elevation and partly in section showing the speed responsive device and the two speed controlled relay switches and related connections.
Figure 3:
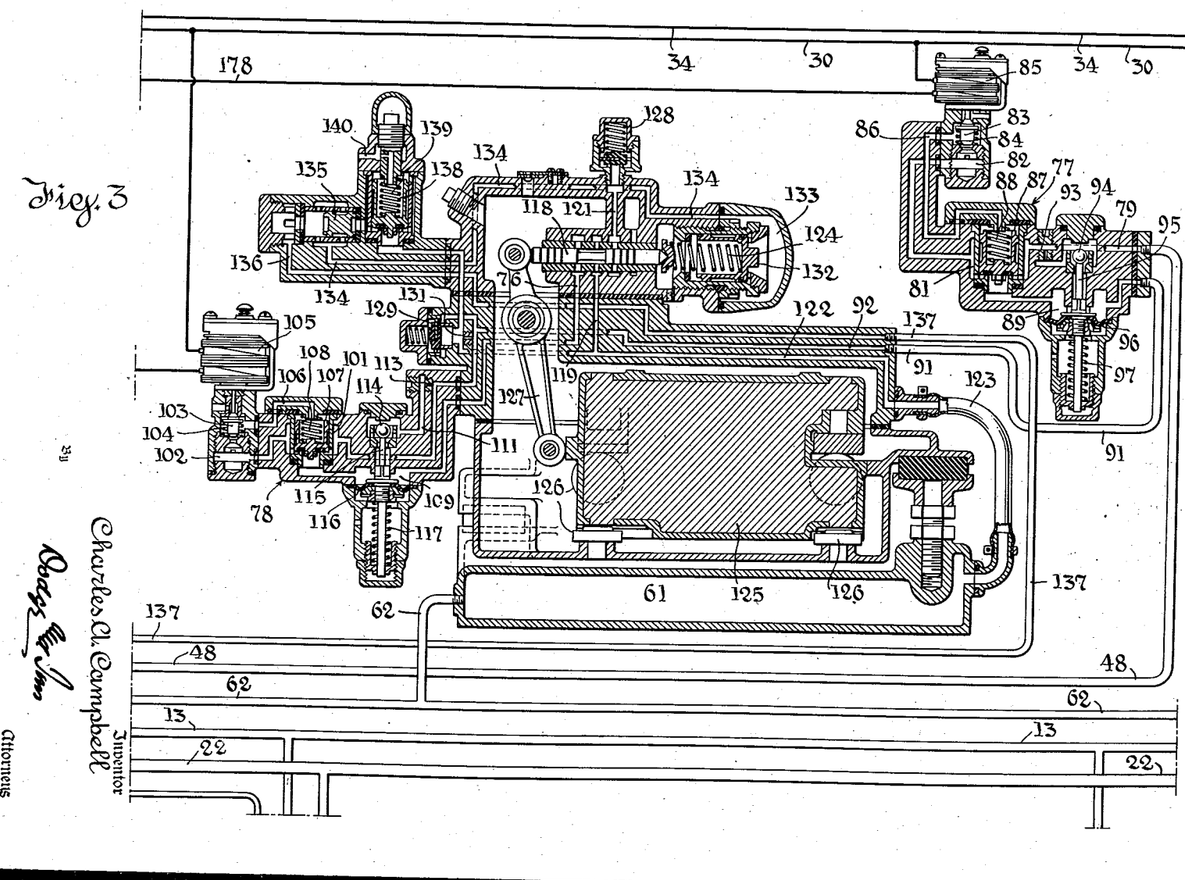
Fig. 3 is a diagrammatic view in vertical section of the deceleration controller and related connections, the controller being drawn on a reduced scale as compared to the preceding figures in order to permit it to be drawn on a single sheet.

The novel structure to be claimed in the present application is shown in Figs. 2 and 3. It is deemed impracticable however, to explain either the operation or the utility of this mechanism without first explaining the environment in which it is used. Consequently, Figs. 1, 4, 5 and 6 have been included in the present application, although they illustrate merely standard elements of the AHSC system.

Instead of entering into a detailed description of the structure illustrated in these figures, a brief running description will be given, together with reference to issued patents in which the mechanism is described in detail.

First, refer to Fig. 1 of the present application. The bracket 21 carries an application valve generally indicated by the numeral 38, and a vent valve generally indicated by the numeral 39. These are of the type described and claimed in the patent to Campbell, 2,136,581, November 15, 1938. The small valve mechanism 40, mounted on top of bracket 21 (Fig. 1) is merely a manually operable reset valve which is manipulated after an automatic emergency application to reset the application and vent valves and thus correspond in a general way to the valve 68 of Patent 2,136,581.

The engineer's brake valve mechanism mounted on the base 18, comprises an engineer's brake valve proper 41, having a manually operable handle 42 which is of the deadman variety. This handle swings in a horizontal plane to establish release, lap, service and emergency conditions. If the handle be released so that it rises, it opens a deadman valve in the cap 43 which vents the connection 44. The valve mechanism indicated at 45 is the change-over valve which may be set at either of two positions, "automatic" and "straight air."

In *automatic position*, the brake valve 41, in conjunction with an equalizing reservoir 46, functions as an ordinary equalizing discharge valve to control the brakes exclusively through the brake pipe 22. Under such conditions, the deceleration controller is ineffective and the subject matter of the present invention is not involved.

In *straight air position* the engineer's brake valve 41 operates as an ordinary straight air valve to connect the control pipe 47 either with the main reservoir or with atmosphere, or to close both connections, thus exercising direct control on the straight air side of the system. Since straight air operation involves deceleration control, it involves directly the features of the present invention. The parts 18, 41, 42, 43, and 45 comprise a brake valve structure now standardized and known in the trade as the U—1 brake valve. This valve is essentially that described and claimed in the patent to Campbell, 2,136,582, November 15, 1938.

That patent also illustrates the same basic AHSC system. It shows the U—1 brake valve in combination with the BA—4 application and vent valve substantially as shown in Fig. 1 of the present application. It also shows the relationship of the brake valve to a deceleration controller similar to that here illustrated but lacking the speed limiting controls of the present invention. It also shows the EP—2 master relay valve of Fig. 4 of the present application, and its relation to the deceleration controller. Reference may be made to that patent for a more elaborate description of these portions of the system, the present description being limited so far as possible to those features which are significant with reference to the invention claimed herein.

The present invention affects simply those applications in which straight air pipe pressure is raised at a rapid rate, and would, if not controlled, produce straight air applications too heavy for the train speed existing at the time the application is started. There are at least four principal ways in which this can take place.

1. *Straight air emergency application made at the brake valve.*—The engineer moves the brake valve handle 42 to emergency position. This connects the main reservoir pipe 13 with the control pipe 47. The double-check valve 50 shifts to its left hand seat so that pressure is developed in the pipe 48 leading to the deceleration controller.

2. *A conductor's emergency application made by opening conductor's valve 36.*—This vents the brake pipe 22 at an emergency rate, with the result that the vent valve 39 opens and not only further vents the brake pipe but also vents the space 49 above the piston of the application valve 38. The resulting shift of the application valve disconnects the emergency pipe 51 from atmosphere and connects it with the discharge side of feed valve 19, so that the double-check valve 50 shifts to its right hand seat and pressure is rapidly built up in pipe 48.

3. *A deadman application* caused by release of the handle 42 and consequent opening of the deadman valve 43. This produces the same sequence of events as the fourth type which is:

4. *A conductor's emergency application made by opening valve 37.*—The deadman valve acting through pipe 44, or the valve 37 acting directly will vent the same spaces, that is, the space 49 above the piston of the application valve, and the space 51 above the actuating diaphragm of the vent valve. Consequently, the vent valve opens, venting the brake pipe 22 and the application valve moves upward charging the emergency pipe 51. From there on the operation is exactly the same as that described under 2 above.

In any one of the four methods, the pressure in the pipe 48 is raised at a rapid and uncontrolled rate. The first method does not involve venting of the brake pipe 22 so that no automatic aspects are there involved. The second, third and fourth methods do involve an emergency reduction of pressure in the brake pipe 22. This directly affects the control valve on the motor vehicle and also the control valves on all cars, starting an automatic emergency application, which normally shifts to an emergency straight air application as will now be explained.

Figure 5:
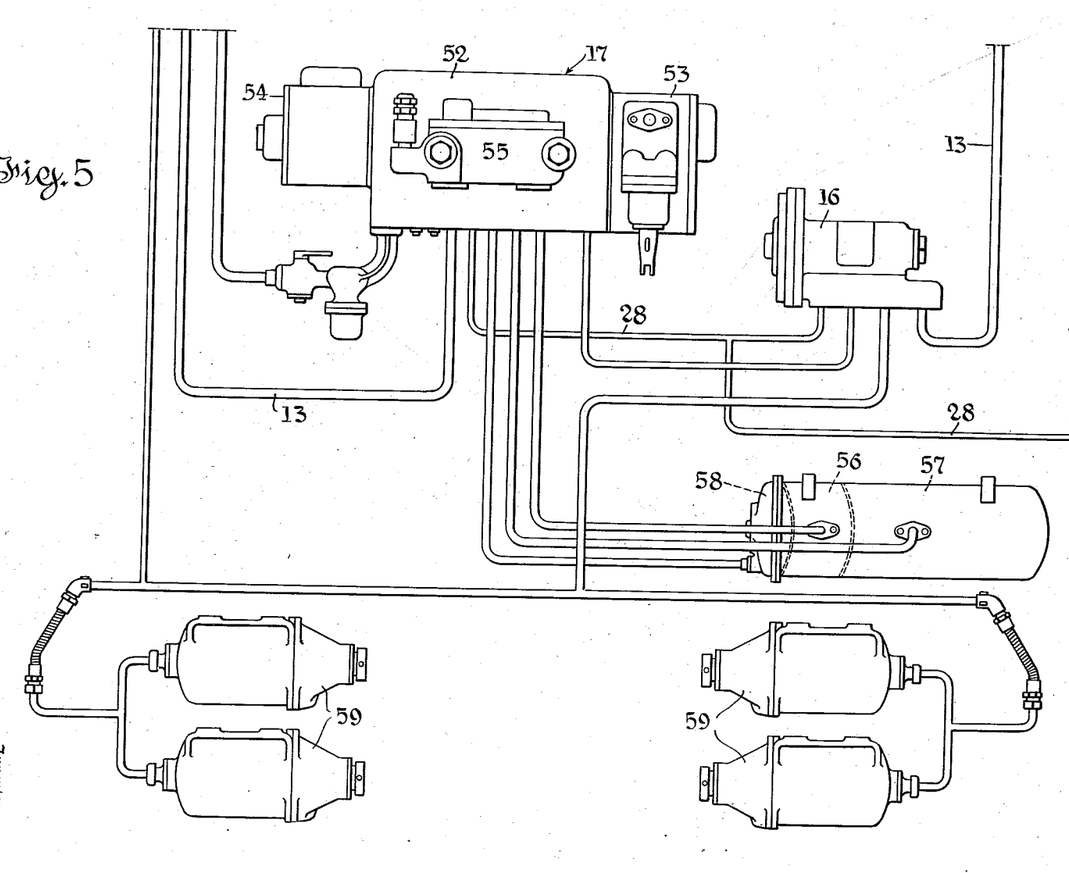
Fig. 5 is a diagrammatic view in elevation at a comparatively reduced scale showing the control valve and the relay associated therewith, in conjunction with the reservoirs, brake cylinders and related pipe connections.

In Fig. 5 is illustrated a control valve known as the D22C control valve. Its detailed construction is not vital to the present invention for various control devices may be substituted. Hence only its general functions need be explained.

Basically the control valve proper is a refined version of the AB valve arranged to give passenger characteristics and to operate a relay which controls brake cylinder pressure instead of itself directly controlling brake cylinder pressure. The major elements of the D22C control valve are the pipe bracket 52, the service portion 53, which is virtually a triple valve, the emergency portion 54, which is a quick action emergency valve, and the safety valve control portion 55. Associated with the control valve is a multiple chamber reservoir. This comprises a chamber 56 which is in effect an auxiliary reservoir associated with the service portion 53, a chamber 57 which is an emergency reservoir furnishing air for emergency application and for graduated release, and a volume chamber 58 which is connected with the diaphragm chamber of the local relay 16. This relay is so arranged as to function selectively in response to pressure developed in the volume chamber 58 by the control valve 17, or in response to pressure developed in the straight air pipe 28 (whichever predominates) to control the admission of air from the main reservoir pipe 13 to the brake cylinders 59 and, alternatively, the exhaust of such air.

In emergency applications starting on the automatic side as outlined above under 2, 3, and 4, when reduction of brake pipe pressure causes the control valve 17 to start an automatic emergency application, the application valve rapidly develops pressure in the emergency pipe 51, and in the control pipe 48. The development of pressure in the control pipe 48 causes, by means hereinafter described, a related development of pressure in the straight air pipe 28. As soon as straight air pipe pressure predominates over the pressure in the volume chamber 58, the straight air pipe assumes control of the relay 16, substantially to the exclusion of the control valve 17.

This shift from automatic to straight air control is familiar in the art, and in its broadest aspects is essentially the type of operation described in the patent to Campbell 2,136,576, November 15, 1938. In that patent, however, a simple change-over valve is used instead of the relatively elaborate control valve 17. However, so far as the present invention is concerned, the ultimate effects are essentially similar, and either arrangement can be used.

The safety valve control device 55 is described and claimed in the Campbell application 175,152, filed November 17, 1937. Its functions will be stated to indicate that this device can be used in conjunction with the present invention. It performs its novel function irrespective of the speed control mechanism disclosed and claimed in the present application.

The safety valve control portion in conjunction with the relay valve 16 serves to limit an automatic service application to a definite brake cylinder pressure, say 36 pounds per square inch. It serves to limit an automatic emergency application to a definite higher brake cylinder pressure, say 60 pounds per square inch. It will permit a straight air application up to the maximum brake cylinder pressure offered by the system, say 100 pounds per square inch, and will permit the reduction of this pressure to the full service value of the automatic system. The automatic service limit is chosen for smooth automatic service braking. The automatic emergency limit is set as high as possible without undue danger of wheel sliding.

The high straight air limit is suited to straight air applications commencing at high train speeds. The mechanism indicated at 55, permits the making of high ratio straight air applications regardless of train speed. Under low speed conditions the making of such a high ratio application would defeat the regulatory function of the deceleration controller and thus would entail the risk of wheel sliding. The present invention fills this gap by imposing appropriate limits of degree and rate of development on straight air applications commenced at low and medium train speeds.

The development of pressure in the pipe 48 results in the development of pressure in the control chamber 61 and this chamber is in communication through the pipe 62 with the EP—2 master relay mounted on bracket 15, Fig. 4.

Omitting for the present the controlling action of the deceleration controller on control chamber pressure, a brief description will be given of the operation of the EP—2 master relay, Fig. 4, and of the magnet valve unit, Fig. 6.

Pipe 62 is connected to the space below the piston 63 of the pneumatic relay and to the space below the actuating diaphragm 64 of the relay switch. The spaces above the piston 63 and above the diaphragm 64 are in direct communication with the straight air pipe 28. The function of the master relay unit is to establish in the straight air pipe a pressure which is equal to the pressure in the control chamber and which follows changes in that pressure with a very small time-lag. When the piston 63 moves up in response to rising control chamber pressure it first closes an exhaust valve generally indicated at 65. Normally it stalls in this position, but if the electrical mechanism fails, it moves further and opens an inlet valve 60 which admits main reservoir air directly to the straight air pipe.

The diaphragm 64 is more sensitive than the piston 63, so that when the diaphragm moves up, it closes a normally open application switch 66 energizing the application wire 32. Conversely when it moves downward beyond its mid position it closes a normally open release switch 67 energizing the release wire 33. Since the switches 66 and 67 are both normally open, and are closed selectively, the application wire 32 and the release wire 33 are energized selectively.

Figure 6:
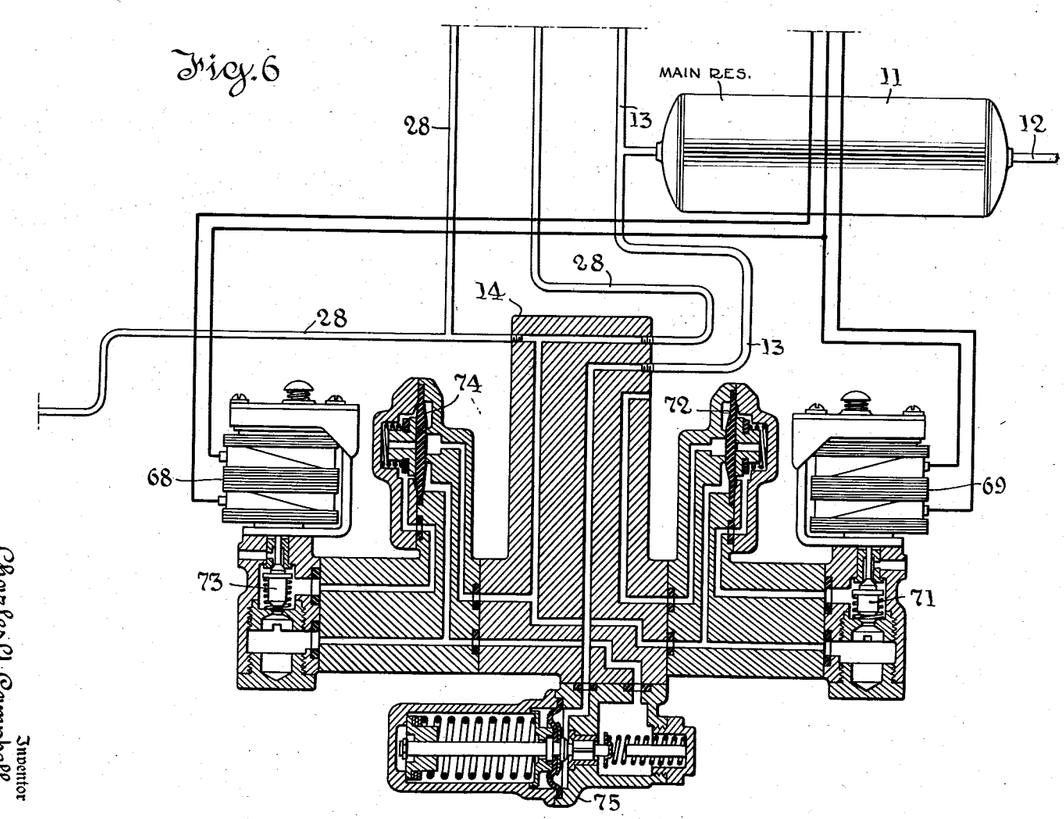
Fig. 6 is a diagrammatic view, in section, of the magnet valve unit controlled by the master relay switch and associated with the contact valve shown on Fig. 5, together with related connections. In this view the main reservoir appears.

Referring now to Fig. 6, there is an application magnet 68 and a release magnet 69 connected to be energized upon energization of the application wire and the release wire respectively.

The release magnet 69 operates a double-beat inlet and vent valve 71 to control the position of a normally closed diaphragm valve 72. The application magnet 68 operates a double-beat admission and vent valve 73 to control the position of a normally closed diaphragm valve 74. The parts are so arranged that when the application wire is energized, and only when it is energized, the valve 74 connects the main reservoir pipe 13 with the straight air pipe 28. Similarly, when magnet 69 is energized, and only when it is energized, valve 72 connects straight air pipe 28 with atmosphere.

The diaphragm valve mechanism indicated at 75 is merely a by-pass valve held open by pressure in the system. It is normally open and closes only to protect the system against loss of pressure fluid in the event of rupture of certain pipe connections.

The mechanism so far described is known in the art. Generally stated, it involves means for developing a pressure in the control chamber 61 and means responsive to the pressure so developed to produce a corresponding straight air application of the brakes.

The structure shown in Figs. 2 and 3 involves a deceleration controller which will modulate the pressure in the chamber 61 to maintain a constant deceleration rate, together with means for so limiting the development of pressure in the control chamber 61 that the deceleration controller will come into action at a control chamber pressure so near that which will produce the desired rate of deceleration, at the existing train speed, as to assure smooth response of the deceleration controller. If control chamber pressure were allowed to rise initially to an excessive value, over-response of the deceleration controller may result in surging and "hunting" as has been demonstrated in commercial service.

The pipe 48 in the AHSC system as heretofore arranged was connected directly with the supply port 76 of the deceleration controller, but the present invention interposes in series, a plurality of electrically controlled limiting valve mechanisms (two being shown), the first of which is indicated generally by the numeral 77 and the second of which is indicated by the numeral 78. These numerals are applied to the body or housing of the respective limiting valves.

The pipe 48 enters the body 77 by way of a port 79, which leads around the bushing 81, of the by-pass valve 87, and thence to the chamber 82 below the supply port of a double-beat admission and exhaust valve 83. The valve 83 is biased by a spring 84 towards its exhaust seat, and is shifted in the opposite direction to open the exhaust and close the supply when the winding 85 is energized. The chamber in which the valve 83 works is connected by a port 86, with the space behind the cup-shaped by-pass valve 87.

Thus, when the winding 85 is de-energized, whatever pressure exists in the pipe 48 will also exist behind the by-pass valve 87, so that this valve will be held closed by the coil compression spring 88. On the other hand, if the winding 85 be energized, the space behind the valve 87 will be vented to atmosphere, and the valve will open sharply as soon as a moderate pressure is developed in the pipe 48.

The valve 87 controls flow to a chamber 89, which is connected by a pipe 91, with a port 92 in the body of the deceleration controller. If the valve 87 remains closed, the port 79 is connected with the chamber 89 by way of a choke 93, but only so long as the valve 94 is open. This valve is held open by a stem 95 which is urged in a closing direction by pressure in the chamber 89, acting on the diaphragm 96. An adjustable loading spring 97 determines the pressure at which the valve 94 will be allowed to close.

It follows that if the winding 85 is de-energized at the time that flow through pipe 48 starts, the rate of flow will be limited by the choke 93, and the pressure developed will be limited to the adjustment of the spring 97 (since the valve 94 is in series with the choke 93). On the other hand, if the winding 85 is energized when flow through the pipe 48 starts, the by-pass valve 87 will open wide so that virtually free flow occurs from the pipe 48 to the port 92. As will be hereinafter explained, the winding 85 will be energized above 80 miles per hour, and de-energized below 80 miles per hour, train speed.

The port 92 leads around the bushing 101 of a second by-pass valve 107, to the space 102 below the supply seat of the double-beat admission and exhaust valve 103. This valve is urged toward its exhaust seat by a coil compression spring 104, and is shifted to its supply seat against the resistance of such spring when winding 105 is energized. It is connected by port 106 of the space behind the by-pass valve 107, and thus controls the movements of the by-pass valve exactly as described with reference to the valve mechanism in 77. The valve 107 is biased to close by spring 108 and controls communication from the port 92 to the space 109. The space 109 communicates with the supply port 76 of the deceleration modulating valve, hereinafter described.

When the by-pass valve 107 is closed, the rate of flow from port 92 to port 111 is limited by choke 113 which is somewhat smaller than the choke 93, already described. The flow through the choke 113 can occur only while the valve 114 is held open by the stem 115. This stem is controlled by diaphragm 116 and loading spring 117, so that it closes in response to pressure in space 109, and will close at a pressure lower than the pressure at which the valve 94 will close.

According to our assumed speeds, the winding 105 is energized when the train speed is above 40 miles an hour, and de-energized when it is below 40 miles an hour. Thus, if pressure is developed in the pipe 48 when the train is running above 40 miles an hour, the by-pass valve 107 will be open. It will be seen, therefore, that below 40 miles an hour both the chokes 93 and 113, act in series to control flow from the pipe 48 to the supply port 76 but only the limiting valve 114 will close to limit the build up. Above 40 and below 80 miles an hour the by-pass valve 108 will be open, so that the choke 93 and the limiting valve 94 will control. Above 80 miles an hour both the by-pass valves 107 and 87 will be opened, so that pipe 48 is directly connected with port 76.

The modulating valve of the deceleration controller is a balanced piston valve of the inside cut-off type, so arranged that it will connect the control chamber port 119, selectively, with the supply port 76, and the exhaust port 121. The control chamber port 119 is connected by passage 122, and flexible hose 123, with the control chamber 61, which is here shown embodied as a base for the deceleration controller. The valve 118 is urged toward its normal position in which it connects the supply port 76 with the control chamber port 119 by a coiled compression spring 124. It is shifted (against the resistance of such spring) first to lap the port 76, and then to connect the ports 119 and 121, by the inertia mass 125 which, upon retardation of the train, moves forward on the anti-friction rollers 126, and reacts upon the valve 118 through the double-armed lever 127. The exhaust port 121 has the usual spring loaded retainer 128.

The spring loaded check valve 129 is simply the usual release check which permits flow from the control chamber 61 to the passage 92, and consequently to the pipe 48, if the engineer's brake valve be moved to release position at a time when the valve 118 laps the port 76. It should be observed further that the by-pass valves 87 and 107 will act as check valves and like the ball check valves 94 and 114 open to permit this flow. Since the latter are not loaded they allow complete depletion of control chamber pressure.

The small choke 131 is provided to permit slow equalization between the port 92 and the control chamber port 122. If the valve 118 should lap port 76, while the engineer's brake valve 41 is in application position, and the engineer later moved the engineer's brake valve to lap position, a pressure higher than control chamber pressure would be trapped in pipe 48 and port 92. The choke permits this to equalize slowly with pressure in the control chamber, so that if the valve 118 should later open port 76, no disturbing pressure surge in the control chamber would occur.

The stress on spring 124 is adjustable by the shifting piston 132 which is exposed on its outer end to pressure in the chamber 133. The chamber 133 is connected by a passage 134 with the side or middle connection of the double-seated check valve 135. This check valve in one position connects the port 134 with the passage 136 and thence with pipe 137 leading to a port in the seat of the engineer's brake valve 41. The engineer's valve is arranged as in Patent 2,136,582, so that in release position and in lap position pipe 137 is vented to atmosphere, but in both application positions the engineer's brake valve admits main reservoir air to pipe 137.

A branch of the control chamber port 122 leads to the center seated area of the change-over valve 138. This valve is loaded by a spring 139, so adjusted that the valve 138 will shift to its outer seat as control chamber pressure rises above a desired value, say 30 pounds per square inch and shifts back at some lower value. This change-over valve is the valve which reduces the loading of the deceleration controller as the train approaches a stop under its control. The arrangement is such, in conjunction with the double seated check valve 135, that if the engineer's brake valve handle 42 is left in either application position, the space 133 will be maintained under pressure delivered by the engineer's valve, but if the valve handle 42 is moved back to lap position, the pipe 137 will be vented, the valve 135 will shift, and leave the valve 138 in control. As soon as control chamber pressure falls sufficiently, the valve 138 will shift downward, closing communication with the control chamber, and venting the passage 134 to atmosphere, by way of the atmospheric vent port 140. (See the patent to Campbell, No. 2,136,573, November 15, 1938.) Except for a slightly different location of the change-over valve and the double-seated check valve, the exact arrangement here illustrated is shown in Patent No. 2,136,582.

To control the energization of windings 85 and 105, use is made of two switches, one for each winding. These switches are mounted on swinging spring loaded armatures. The switches are normally open, but when pressure starts to build up in the control chamber 61, a small pressure motor operates a wiping roller which forces the switch closed, and then frees the switch, so that it may again open. The closure of the switch momentarily energizes the windings 85 and 105, and at the same time closes a sticker circuit through a magnet winding and through a circuit interrupter driven by an axle of the car. Excitation of the magnet winding will hold the armature against its spring loading, and hence hold the switch closed, provided the speed of the car is above a critical value determined by the spring loading of the armature. To improve the controlling action, the winding of the sticker magnet is provided with a copper band which delays the dissipation of the magnet field during the periods of interruption. By closing the switches mechanically, all difficulties due to air gap and slow pick-up are eliminated. Incidently, the pressure motor which closes the switch as control chamber pressure starts to build up, also serves to knock the switches open if they should tend to lag as control chamber pressure approaches atmospheric pressure.

Referring now to Fig. 4 one terminal of battery 35 is connected to the common wire 34, which runs through the train, and the other is connected to the supply wire 30, which leads to the supply contacts of the master switch.

In Fig. 2 the two speed responsive switches are generally indicated by the numerals 141 and 142, while the circuit breaker applied to their frames, is indicated generally by the numeral 143.

The circuit breaker comprises a fixed contact 144, a swinging contactor 145, a spring 146 which draws the contactor toward the contact, and a cam 147 driven by a car axle consequently having a rotary speed which is proportional to train speed. The cam periodically forces the contactor away from the contact interrupting the sticker circuit. A condenser 148 is connected to reduce the arcing between the contactor 144 and the contactor 145.

Since the switches generally indicated at 141 and 142 are identical, except for adjustment, only one will be described. The chamber 151 to the right of the diaphragm 152 is connected to the control chamber 61 by means of a branch of the pipe 62. The diaphragm 152 acts through a thrust-head 153 on the push-rod 154. This rod is pinned to the wiper arm 155, which is fulcrumed on the frame at 156. Also supported on the frame above the arm 155 is an armature 157, which is fulcrumed at 158 and co-acts with the pole piece 159 of the sticker magnet whose winding surrounds the pole piece, and is connected between the terminals 161 and 162. A copper band 163 encircles the winding to delay the fade-out of the field, and consequently to delay the tendency to release the armature 157. The drop of the armature is adjustable by means of the stop screw 164. A spring 165, which may be tensioned adjustably by means of the screw 166, tends to draw the armature 157 away from the pole piece 159. Carried by, but insulated from the armature 157, are two contactors, an upper contactor 167 and a lower contactor 168, which on upward movement of the armature close simultaneously and respectively upon an upper contact 169 and a lower contact 171. The upper contactor 167 is connected with the terminal 172 and the lower contactor with terminal 173. A roller 174 carried by the upper end of the wiper arm 155, co-acts with a bow spring 175 on the armature to wipe the armature upward and close both contactors against their respective contacts. As the arm 155 swings counter-clockwise, the roller 174 over travels the end of the bow spring 175, as indicated in dotted lines with reference to the switch 142, so that the armature is again free to drop when the wiper arm is in its limiting left hand position. When pressure fades out in the control chamber a spring 176 restores the diaphragm 152 and causes the roller 174 to strike the finger 177, also mounted on the armature 157, and swing the armature in a direction to open both circuits.

The circuit for the winding 85, is from the negative terminal of the battery by way of wire 30 to winding 85, thence by wire 178 to terminal 173 which is connected to the lower contactor 168, thence through the lower contact 171 and wires 179 and 181 to the positive terminal of the battery. Consequently, when the armature 157 is up, the winding 85 is continuously energized.

The sticker circuit is from the negative terminal of the battery through wire 30 to terminal 161, through the magnet winding to terminal 162 to upper contact 169, thence through upper contactor 167 to terminal 172, thence by wire 182 to contact 144 of the circuit breaker, and thence through the contactor 145 and wire 181 to the positive terminal of the battery.

The circuits for the switch 142 are similar except that they control the winding 105 as clearly indicated in the diagram. The only difference between the two switches 141 and 142 is that the spring 165 of switch 141 is more heavily tensioned so that the armature 157 will be held up at speeds over 80 miles an hour. The corresponding spring of the switch 142 is less heavily tensioned so that it will not draw the armature down until the speed falls to a lower value, here assumed to be 40 miles an hour.

It follows that above 80 miles per hour both windings 85 and 105 are energized. Hence, both the by-pass valves 87 and 107 will be open. Between 80 and 40 miles an hour, the winding 85 will be de-energized and the winding 105 energized, so that by-pass valve 87 closes, and by-pass valve 107 is open. Below 40 miles an hour both windings 85 and 105 are de-energized, and both the by-pass valves 87 and 107 are, consequently, closed.

Since the speed control affects the flow of air from the engineer's brake valve to the supply port 76, the speed control is effective merely to limit the rate at which control chamber pressure can be built up, and the maximum value which it can attain in commencing a straight air application. Limitation of the control chamber pressure involves limitation of the initial maximum braking pressure. Consequently, when the deceleration controller becomes effective and starts to modulate the application, i. e., starts to release it to maintain the deceleration rate constant, the speed control has done its work and the deceleration controller takes over complete control of the brakes.

Thus the invention does not involve a compound control in which the brakes are controlled both in response to speed and to deceleration. On the contrary it involves two distinct controls which are serially effective. The first imposes a maximum limit on control chamber pressure, such limit being suited to train speed at the time the application commences. This control is complete, and ceases to be effective as soon as the modulating valve 118 laps the supply port 76. The second control is a simple deceleration control and persists to the stop unless the brakes are sooner released. All that the speed control does is to limit the straight air application to a maximum value at which the deceleration controller will take control smoothly.

As already explained, the disclosure in the present application has been based on the use of two relays responding at two different speeds and imposing two different pressure limitations on the development of control chamber pressure. This has been done to simplify the description, and as explained it is believed that at least three such relays affording control at three different speeds will be found desirable. Any number might be used and the larger the number of such controls the greater the approach to graduated control of the initial pressure developed in the control chamber. The ideal arrangement is a strictly progressive control in which the initial control chamber pressure is limited according to the train speed existing at the commencement of the application, the limitation being such that at that speed the control chamber pressure will produce an initial application sufficient to establish from the start the desired deceleration rate. The use of a plurality of relays responding at different train speeds is simply a convenient mechanism for approximating the desired result. If a curve were plotted for values in which the abscissae represented train speed and the ordinates represented permissible control chamber pressures at the commencement of brake applications, the control points of the various relays would simply be points on that curve. Two solutions of the technical problem are possible,—a device which gives progressive adjustment in accordance with the indications of the curve and a series of devices which represent spaced points on the curve and give a commercially satisfactory solution. A series of devices each controlling a corresponding limiting valve is believed to offer a better solution than a single pressure limiting valve whose control point is adjusted according to speed, but, for the purpose of the present invention, broadly considered, the two are equivalents.

Consequently, although the invention has been described in considerable detail in the present application, the disclosure is intended to be illustrative and not limiting.

What is claimed is:

1. The combination of a vehicle brake; power operated means for applying said brake; controlling means for causing said power means to apply and release the brake; means responsive to deceleration produced by a brake application serving to control said power operated means to maintain during a brake application a chosen deceleration rate; and means responsive to vehicle speed and operating independently of said means responsive to deceleration to impose a maximum limit on a brake application according to vehicle speed at the commencement of the application.

2. The combination defined in claim 1 in which the means responsive to vehicle speed so limits the brake application in relation to vehicle speed that the application will initiate a deceleration rate which approximates said chosen deceleration rate, whereby the means responsive to deceleration comes into action gradually.

3. In a fluid pressure train brake system, the combination of a train pipe; brake applying means arranged to be rendered active in proportion to rising fluid pressure in said train pipe; a control chamber; means responsive to pressure in said control chamber and serving to establish a related train pipe pressure; control means operable to develop pressure rapidly in said control chamber; means responsive to train speed serving to terminate such increase at pressures so proportioned in relation to train speed as to establish a desired initial deceleration rate; and means independent of train speed and responsive to deceleration produced by a brake application, serving to modulate pressure in the control chamber to maintain substantially the same deceleration rate during the brake application.

4. The combination with a fluid pressure brake of two successively acting functionally independent braking pressure controls, the first of which responds to vehicle speed at the commencement of a brake application to establish a maximum pressure limit for the commencing application, appropriate to such train speed, and the second of which responds to the deceleration produced by such application and modulates braking pressure in a range below said maximum to maintain a uniform deceleration rate.

5. The combination with a fluid pressure brake of two successively acting functionally independent braking pressure controls, the first of which responds to vehicle speed at the commencement of a brake application to establish a maximum pressure limit for the commencing application, appropriate to such train speed, and the second of which responds to the deceleration produced by such application and modulates braking pressure in a range below said maximum to maintain a uniform deceleration rate; and means rendered effective as an incident to release of the brakes to restore said controls to a neutral condition.

6. In a fluid pressure brake system the combination of a train pipe, at least one fluid pressure braking unit connected with the train pipe and arranged to be actuated by variations of fluid pressure in said pipe; a control chamber; means responsive to pressure in said chamber for controlling the pressure in said pipe; manually operable valve means for establishing desired pressures in said chamber; means responsive to train speed for limiting the pressure so established in said chamber; and valve means responsive to the deceleration due to an application of the brakes for controlling the pressure in said chamber below the limit so established.

7. In a fluid pressure brake system the combination of a normally charged brake pipe; a normally vented straight air pipe; brake applying units connected with said pipes and each including a brake cylinder, a relay mechanism for controlling brake cylinder pressure, and electrically actuated valves for supplying air to the straight air pipe and for venting the straight air pipe; relay means adapted to function in response to a variable regulatory pressure to vary the pressure in the straight air pipe, said relay means including switching means for selectively operating said electrically actuated valves; two means for controlling said regulatory pressure, one of said means being manually operable and the other operating in responsive to depletion of brake pipe pressure; modulating means responsive to the decelerative rate produced by a brake application and serving to exercise a secondary control on said regulatory pressure; and means responsive to train speed and rendered effective as an incident to the development of said regulatory pressure to limit the maximum value attained by said regulatory pressure according to train speed.

8. In a fluid pressure brake system the combination of a normally charged brake pipe; a normally vented straight air pipe; local brake equipments connected thereto and each comprising a brake cylinder, a local relay normally subject to straight air pipe pressure, an associated automatic valve subject to brake pipe pressure, and adapted to assume control of the local relay in response to reduction of brake pipe pressure, and local electrically actuated valves for admitting pressure fluid to the straight air pipe and for venting pressure fluid from the straight air pipe; master relay means subject to a regulatory pressure and to opposing straight air pipe pressure, and including valve means for admitting and exhausting pressure fluid to and from the straight air pipe, and switches connected to energize selectively said electrically actuated valves; two controlling means for establishing said regulatory pressure, one comprising a manually operable valve and the other an automatic valve capable of functioning in response to brake pipe pressure reductions; speed responsive means for imposing a maximum limit upon said regulatory pressure; means operable as an incident to the development of such regulatory pressure to cause said speed responsive means to exercise its pressure limiting function; and means for modulating said regulatory pressure comprising an admission and exhaust valve mechanism, and means responsive to deceleration produced by a brake application for actuating said admission and exhaust valve mechanism, to maintain a substantially uniform deceleration rate.

9. A fluid pressure brake system comprising, in combination, a control chamber; means responsive to changes of control chamber pressure serving to apply and release the brakes; a controlling valve for supplying pressure fluid to said control chamber to develop a brake applying pressure therein; a modulating valve having a supply port connected with the controlling valve, a control chamber port connected with the control chamber and an exhaust port, said modulating valve serving to connect the control chamber port selectively with said supply port and with said exhaust port; means responsive to deceleration produced by a brake application for actuating said modulating valve; a pressure limiting valve interposed in the connection between said controlling valve and said supply port and adapted to close such connection at a definite pressure acting on its discharge side; a by-pass valve controlling a flow path around said pressure limiting valve; and speed responsive means for opening or closing said by-pass valve at the start of an application according as train speed is then above or below a chosen value.

10. A fluid pressure brake system comprising, in combination, a control chamber; means responsive to changes of control chamber pressure serving to apply and release the brakes; a controlling valve for supplying pressure fluid to said control chamber to develop a brake applying pressure therein; a modulating valve having a supply port connected with the control chamber and an exhaust port, said modulating valve serving to connect the control chamber port selectively with said supply port and with said exhaust port; means responsive to deceleration produced by a brake application for actuating said modulating valve; a pressure limiting valve interposed in the connection between said controlling valve and said supply port and adapted to close such connection at a definite pressure acting on its discharge side; flow restricting means interposed in the path through said pressure limiting valve; a by-pass valve controlling a flow path around said flow restricting means and said pressure limiting valve; and speed responsive means for opening or closing said by-pass valve at the start of an application according as train speed is then above or below a chosen value.

11. A fluid pressure brake system comprising, in combination, a control chamber; means responsive to changes of control chamber pressure serving to apply and release the brakes; a controlling valve for supplying pressure fluid to said control chamber to develop a brake applying pressure therein; a modulating valve having a supply port connected with the controlling valve, a control chamber port connected with the control chamber and an exhaust port, said modulating valve serving to connect the control chamber port selectively with said supply port and said exhaust port; means responsive to deceleration produced by a brake application for actuating said modulating valve; a pressure limiting valve interposed in the connection between said controlling valve and said supply port and adapted to close such connection at a definite pressure acting on its discharge side; a by-pass valve controlling a flow path around said pressure limiting valve; electrically actuated means for causing said by-pass valve to open or close according as said electrically actuated means is energized or deenergized; and a speed responsive relay comprising a magnet winding, a circuit breaker operated at a rate proportional to train speed, an armature arranged to be attracted by said magnet winding, yielding means biasing said armature in the opposite direction, a pair of switches arranged to be actuated by said armature so that the switches are open when the armature is in its biased position and closed when the armature is attracted in opposition to said bias, a sticker circuit including said interrupter said winding and one of said switches, a controlling circuit including said electrically actuated means and the other of said switches, and a pressure motor arranged to be actuated by the development of initial pressure in said control chamber and serving to shift said armature to close said switches and then free the armature.

12. The combination defined in claim 11 in which the motor which operates in response to control chamber pressure to close the switches is so arranged that upon substantial dissipation of control chamber pressure the motor acts to force the switches open, if they then be in closed position.

13. A fluid pressure brake system comprising, in combination, a control chamber; means responsive to changes of control chamber pressure serving to apply and release the brakes; a controlling valve for supplying pressure fluid to said control chamber to develop a brake applying pressure therein; a modulating valve having a supply port connected with the controlling valve, a control chamber port connected with the control chamber and the exhaust port, said modulating valve serving to connect the control chamber port selectively with said supply port and with said exhaust port; means responsive to deceleration produced by a brake application for actuating said modulating valve; a plurality of pressure limiting valves interposed in the connection between said controlling valve and said supply port, each such pressure limiting valve being adapted to close such connection at a definite pressure developed on its discharge side; by-pass valves each controlling a flow path around a corresponding pressure limiting valve; and speed responsive means controlling the opening and closing movements of said by-pass valves and arranged to control in response to train speed existing at the commencement of a brake application, the parts being so arranged that at maximum train speed no limiting valve is effective and at lower speeds the limiting valves become successively effective to limit control chamber pressure to lower and lower values whereby the maximum brake application produced is proportioned to train speed at the time the application is initiated.

14. The combination defined in claim 13, in which the pressure limiting valves are interposed in series with each other in the connection betwen the controlling valve and the supply port.

15. The combination defined in claim 13, in which the flow capacity of each pressure limiting valve is adjustable whereby the maximum flow capacity through the valve may be set independently of the pressure at which the valve is set to close.

16. The combination defined in claim 13, in which the flow capacity and also the closing pressure of each pressure limiting valve is capable of independent adjustment.

17. A fluid pressure brake system comprising, in combination, a control chamber; means responsive to changes of control chamber pressure serving to apply and release the brakes; a controlling valve for supplying pressure fluid to said control chamber to develop a brake applying pressure therein; a pressure limiting valve interposed in the connection between said controlling valve and said control chamber and adapted to close such connection at a definite control chamber pressure; a by-pass valve controlling a flow path around said pressure limiting valve; electrically actuated means for causing said by-pass valve to open or close according as said electrically actuated means is energized or deenergized; and a speed responsive relay comprising a magnet winding, a circuit breaker operated at a rate proportional to train speed, an armature arranged to be attracted by said magnet winding yielding means biasing said armature in the opposite direction, a pair of switches arranged to be actuated by said armature so that the switches are open when the armature is in its biased position and closed when the armature is attracted in opposition to said bias, a sticker circuit including said interrupter, said winding and one of said switches, a controlling circuit including said electrically actuated means and the other of said switches, and a pressure motor arranged to be actuated by the development of initial pressure in said control chamber and serving to shift said armature to close said switches and then free the armature.

18. The combination defined in claim 17 in which the motor which operates in response to control chamber pressure to close the switches is so arranged that upon substantial dissipation of control chamber pressure the motor acts to force the switches open if they then be in closed position.

19. A fluid pressure brake system comprising, in combination, a control chamber; means for applying and releasing brakes in response to changes of control chamber pressure; brake controlling valve means for supplying pressure to and releasing it from said control chamber; a modulating valve having a port connected with the control chamber; a supply port connected with the brake controlling valve means and an exhaust port, said modulating valve means serving to connect the control chamber port selectively with the supply port and with the exhaust port; means responsive to deceleration produced by brake application to operate said modulating valve means; and means forming a restricted communication between said supply port and said control chamber, said communication by-passing said modulating valve and being of such small capacity as to exercise a negligible effect on the modulating action of said valve.

20. The combination with a vehicle power brake system including means responsive to deceleration produced by a brake application and serving to modulate such application to maintain a substantially uniform deceleration rate, of means responsive to vehicle speed and serving to limit in relation to speed the initial intensity of a brake application.

21. The combination defined in claim 20 in which the means responsive to speed establishes selectively a plurality of limits each corresponding to and appropriate for a speed range of limited extent.

CHARLES A. CAMPBELL.